(12) United States Patent
Medvinsky et al.

(10) Patent No.: US 10,498,540 B2
(45) Date of Patent: Dec. 3, 2019

(54) EFFICIENT ENCRYPTED SOFTWARE DISTRIBUTION MECHANISM

(71) Applicant: ARRIS Enterprises LLC, Suwanee, GA (US)

(72) Inventors: Alexander Medvinsky, San Diego, CA (US); Eric J. Sprunk, Carlsbad, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 188 days.

(21) Appl. No.: 15/603,869

(22) Filed: May 24, 2017

(65) Prior Publication Data

US 2017/0346641 A1   Nov. 30, 2017

Related U.S. Application Data

(60) Provisional application No. 62/340,717, filed on May 24, 2016.

(51) Int. Cl.
| | |
|---|---|
| *H04L 9/32* | (2006.01) |
| *H04L 9/08* | (2006.01) |
| *H04L 9/14* | (2006.01) |
| *H04L 9/30* | (2006.01) |
| *G06F 21/60* | (2013.01) |

(Continued)

(52) U.S. Cl.
CPC .......... *H04L 9/3263* (2013.01); *G06F 21/121* (2013.01); *G06F 21/602* (2013.01); *H04L 9/085* (2013.01); *H04L 9/0838* (2013.01); *H04L 9/0844* (2013.01); *H04L 9/0861* (2013.01); *H04L 9/0894* (2013.01); *H04L 9/14* (2013.01); *H04L 9/30* (2013.01); *H04L 9/3247* (2013.01); *H04L 63/0435* (2013.01);

(Continued)

(58) Field of Classification Search
CPC ... G06F 21/121; G06F 21/602; H04L 9/0894; H04L 63/06; H04L 63/0823; H04L 2463/062; H04L 9/3263; H04L 9/0861; H04L 9/085; H04L 9/14; H04L 9/30; H04L 9/0838; H04L 9/3247; H04L 9/0844; H04L 63/0435
See application file for complete search history.

(56) References Cited

U.S. PATENT DOCUMENTS

| | | |
|---|---|---|
| 7,383,438 B2 | 6/2008 | Fahrny |
| 8,520,850 B2 | 8/2013 | Helms |

(Continued)

OTHER PUBLICATIONS

PCT International Search Report & Written Opinion,Re: Application No. PCT/US2017/034213, dated Aug. 24, 2017.

*Primary Examiner* — Baotran N To
(74) *Attorney, Agent, or Firm* — Thomas A. Ward

(57) ABSTRACT

A method and system are provided for improved distributing of a complete software image to all electronic devices of a certain type or model while using encryption to limit its use to specific ones of those devices. In the method, the entire software image is encrypted with a global key and the encrypted software image is distributed to all devices which have the capability of running that software. The global software decryption key for decrypting the software image is uniquely encrypted for every device that is authorized to use the software and the encrypted global software key is distributed to those devices from a field or factory provisioning server across a point-to-point connection.

10 Claims, 5 Drawing Sheets

(51) Int. Cl.
*G06F 21/12* (2013.01)
*H04L 29/06* (2006.01)

(52) U.S. Cl.
CPC .......... *H04L 63/06* (2013.01); *H04L 63/0823* (2013.01); *H04L 2463/062* (2013.01)

(56) References Cited

U.S. PATENT DOCUMENTS

| | | |
|---|---|---|
| 8,627,083 B2 | 1/2014 | Qiu |
| 2009/0180617 A1 | 7/2009 | Peterka et al. |
| 2015/0026452 A1* | 1/2015 | Roelse ................ H04L 63/0428 713/150 |
| 2015/0222426 A1* | 8/2015 | Vernia .................. H04L 9/0822 713/165 |
| 2015/0326563 A1 | 11/2015 | Chan et al. |

* cited by examiner

EFFICIENT ENCRYPTED SOFTWARE DISTRIBUTION MECHANISM

CLAIM OF PRIORITY

This application claims priority under 35 U.S.C. § 119(e) from earlier filed U.S. Provisional Application Ser. No. 62/340,717, filed May 24, 2016, which is hereby incorporated by reference.

BACKGROUND

In some cases, software running in an electronic device contains very sensitive intellectual property where either the code or software logic or cryptographic keys embedded in the code, or both, need to be kept confidential and must be stored in encrypted form.

In addition to confidentiality, it also may be important to limit the use of the encrypted code image to only specifically authorized electronic devices. For example, the same SOC (System on a Chip) with the same boot code and same code encryption key may be used in multiple device models and even by multiple device manufacturers. Despite this, there may be encrypted software that is only authorized to be decrypted in a specific device model. Likewise, there may be encrypted software that is only authorized to be decrypted in devices that are sold to a specific network operator, regardless of device model. In yet other cases, the encrypted software should only be decrypted in a device when the corresponding end user subscribes to a specific service.

One approach that addresses the above problem divides the software image into two portions—a larger portion that is encrypted with a common key such that the encrypted larger portion is exactly the same for every device and can be easily included in each manufactured device or can be downloaded with a common code download for all devices. And there is a smaller portion of the software that is encrypted with a key that is unique to each device. A separate copy of the smaller portion of the software needs to be uniquely encrypted and later delivered to each device either in the factory or in the field, post-deployment. The smaller software portion is the more secret part of the software that can have fine authorization rules applied to it and can be delivered to the exact subset of devices that are authorized to receive that software and the corresponding services or functionality that the software enables.

One drawback to the aforementioned approach is that only a small part of the software has the fine authorization rules applied. The bulk of the software would still be available to all devices and device models that have the same global code decryption key. In some cases a manufacturer, service provider or vendor would like to keep all of their software confidential and restricted to only specific devices and would like to apply the fine authorization rules to all of their software and not just a small portion of it. Unfortunately, a scalability problem would arise if the complete software image is encrypted using this existing approach, either causing the manufacturing line to slow down or causing an unreasonably large amount of network bandwidth to be used (since a uniquely encrypted software image cannot be broadcast or multicast to all of the devices and must be resent to each device individually).

Another drawback to the existing approach is the inconvenience of having to break up a software image into two parts. It is also inconvenient because every time that the software is modified it has to be split into two portions and the portion having the fine authorization applied has to be distributed in a significantly different manner from the rest of the software. Making an update to one part of the code image without affecting the second may be challenging.

SUMMARY

Disclosed herein is a method of executing a software image in a selected subset of electronic devices. The method includes provisioning a plurality of electronic devices with an encrypted software image that is encrypted in each of the electronic devices with a global cryptographic security key. A triggering message is sent to a selected subset of the electronic devices over a communication network. The triggering message requests the selected subset of electronic devices to acquire the common global cryptographic security key. A key server receives from each electronic device in the selected subset a message that includes (i) a public key agreement key of a public/private key pair that is generated by the respective electronic device in response to receipt of the triggering message (ii) a digital certificate of the respective electronic device signed by a private signature key of a certificate authority and (iii) a digital signature over the message that is generated using a private signature key of the respective electronic device. The digital certificates and message signatures received from the electronic devices are verified and, for each verified electronic device, the key server generates a shared secret using a key agreement algorithm, the public key agreement key of the respective verified electronic device and a private key agreement key of the key server. The shared secret that is shared with each respective one of the verified electronic devices is used to encrypt a reply message to each respective verified electronic device. The reply message includes the global cryptographic key. The reply messages are sent to the respective verified electronic devices so that the verified electronic devices are able to decrypt the reply messages to obtain the global cryptographic key to thereby decrypt and execute the encrypted software images.

Also disclosed is one or more non-transitory computer-readable storage media containing instructions which, when executed by one or more processors perform a method of executing a software image in a selected subset of electronic devices. The method includes establishing a two-way encrypted and authenticated session between a key server and each electronic device in a selected subset of electronic devices that have each been provisioned with an encrypted software image that is encrypted with a common global cryptographic key. The two-way encrypted and authenticated session is established in response to a triggering message received by the selected subset of the electronic devices. The triggering message requests the selected subset of electronic devices to acquire the common global cryptographic key. A request is received for receipt of the common global cryptographic key from each of the electronic devices in the selected subset over the two-way encrypted and authenticated session. A reply message is sent to each of the electronic devices in the selected subset over the two-way encrypted and authenticated session. The reply message includes the global cryptographic key encrypted by a shared session key generated during establishment of the two-way encrypted and authenticated session so that the electronic devices are able to decrypt the global cryptographic key using the shared session key to thereby decrypt and execute the encrypted software images.

Also disclosed is a provisioning server that includes one or more processors and a non-transitory computer-readable storage medium comprising instructions that, when executed, control the one or more processors to be configured for performing a method that includes receiving over a communications network a request for a common global cryptographic key from each electronic device in a selected subset of electronic devices that have each been provisioned with a unique individual device key and an encrypted software image that is encrypted with the common global cryptographic key. The request includes a device identifier of the electronic device from which the request is received. The request is sent in response to a triggering message received by the selected subset of the electronic devices. The triggering message requests the selected subset of electronic devices to acquire the common global cryptographic key. A database is received that includes a plurality of encrypted copies of a common global cryptographic key that are each copy encrypted with a different one of the unique individual device keys that are also provided to the electronic devices to thereby define a plurality of uniquely encrypted copies of the common global cryptographic key. Based on the device identifier received in the request from each of the electronic devices in the selected subset of electronic devices, the uniquely encrypted copies of the common global cryptographic keys respectively associated with the electronic devices in the selected subset of electronic devices are obtained from the database. A reply message is sent to each of the electronic devices in the selected subset over the communication network. Each of the reply messages includes the uniquely encrypted copy of the common global cryptographic key respectively associated with the electronic device in the selected subset to which the reply message is sent so that the electronic device is able to decrypt the common global cryptographic key using the unique individual device key to thereby decrypt and execute the encrypted software images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As detailed below, techniques and arrangements are provided which can distribute a complete software image to all electronic devices of a certain type or model and yet limit its use to specific ones of those devices without the need to divide the software image into multiple parts. In one aspect, the entire software image is encrypted with a global key and the encrypted software image is distributed to all devices which have the capability of running that software. However, the global decryption key for that software is by default not made available to any of the electronic devices and thus they cannot actually make use of that software and execute it. Rather, the global software decryption key, referred to herein as the global key GK, will be uniquely encrypted for every device that is authorized to use the software and the encrypted GK is distributed to those devices from a field or factory provisioning server across a point-to-point connection. Thus, while the globally encrypted software image is in every electronic device belonging to the same family—still, only specifically authorized devices will be able to decrypt and execute that software.

Figure 1:
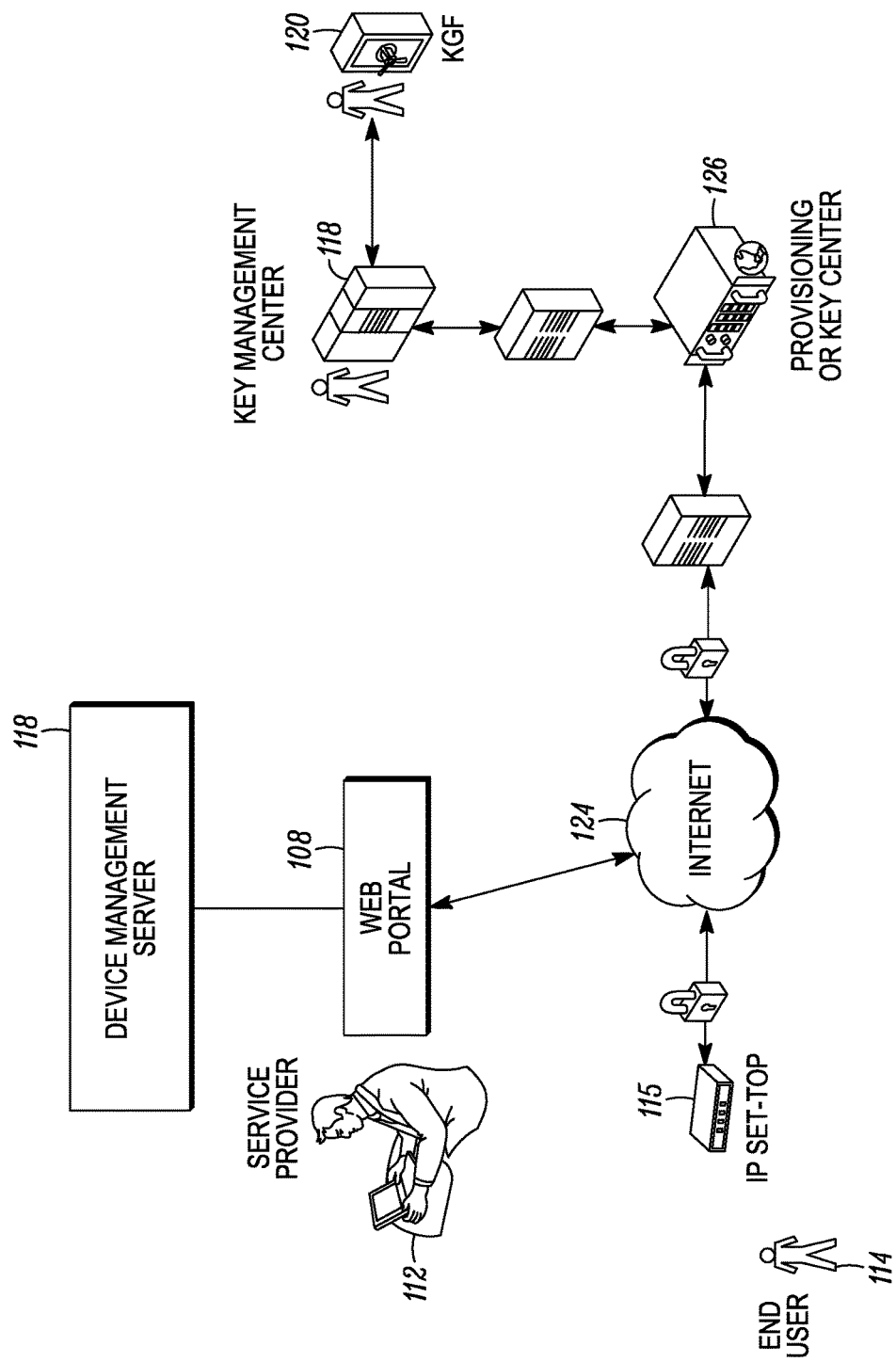
FIG. 1 shows a block diagram of one example of an operating environment in which the techniques described herein may be implemented.

FIG. 1 shows a block diagram of one example of an operating environment in which the techniques described herein may be implemented. Electronic device 115 is generally indicative of a wide variety of devices that are able to communicate over a network and is not intended to suggest any limitation as to the scope of use or functionality of the system(s) and methods described herein. For example, device 115 may be a consumer electronic device such as a mobile phone, a personal digital assistant, a personal computer, a personal media player, a computer/television device, a set-top box, a digital television, a hard-drive storage device, a video camera, a DVD player or another type of known or later developed electronic device.

For purposes of illustration only and not as limitation on the subject matter described herein the electronic device 115 will be described as a set top box that is operated by a service provider 112 (e.g., an MSO). The set top box 115 is deployed in the field to an end user customer 114. The end user customer 114 can communicate with the service provider 112 any suitable network 124 such as, for example, a Wireless Wide Area Network (WWAN), WiMax, 3GPP, terrestrial or a satellite transmission network, and/or a landline transmission network, such as a Wide Area Network (WAN), DSL, fiber or cable network. In the example of FIG. 1 the network 124 is illustrated as the Internet.

In this example the end user customer 114 interacts with the service provider 112 through one or more web portals 108, which provide a single front-end interface that is accessed by a client-based application such as a conventional web browser. A device management server 118 associated with the service provider 115 may be used, as described in more detail below, to instruct authorized electronic devices such as set top box 115 to obtain the cryptographic key(s) needed to decrypt the encrypted software image. In one embodiment, the device management server 118 may be located in the headend of the network operated by the service provider While FIG. 1 shows the device management server 118 being associated with the service provider 112, in other embodiments the device management server 118 may be associated with another entity such as the device manufacturer or a third party, for instance.

The operating environment shown in FIG. 1 also includes a key management center 118, which oversees the key generation process and controls and maintains the cryptographic keys that are generated. The key management center 118 obtains the cryptographic keys from a key generation facility (KGF) 120, which generates the keys that are used in the processes described herein. The KGF 120 may be an online or offline facility and it may include, or have access to hardware secure modules (HSMs) in which the keys and secure data may be stored. After the key management center 118 obtains the keys from the KGF 120 it loads them onto an on-line provisioning or key server 126. The on-line provisioning server 126 is accessible over the Internet 124 to the electronic devices (e.g., set top box 105) that are to be provisioned with cryptographic keys, which are needed to decrypt the encrypted software image.

Figure 2:
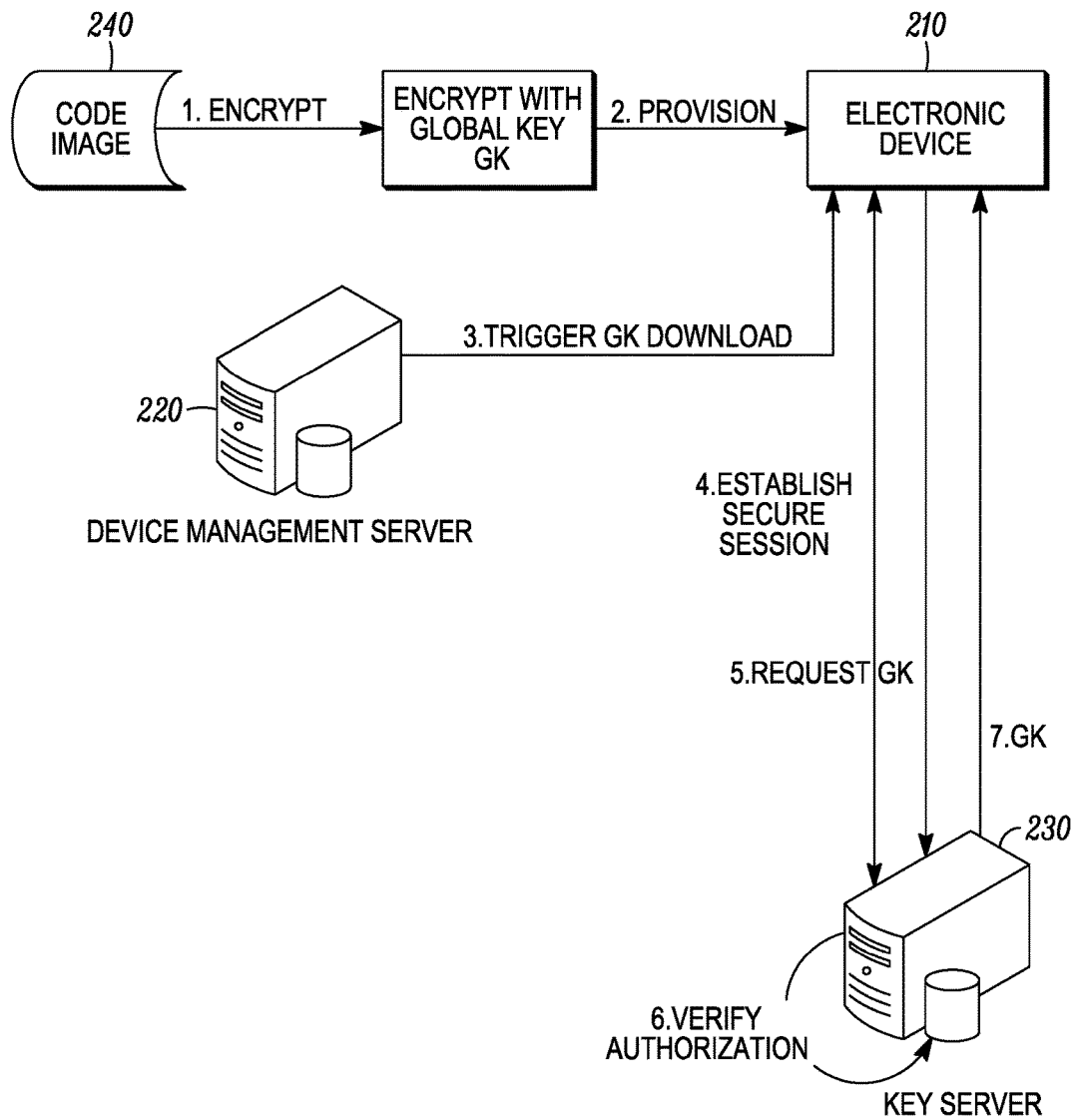
FIG. 2 shows one example of a sequence of messages that may be communicated between an electronic device, a device management server and a key server so that the electronic device is able to decrypt and execute an encrypted software image.

FIG. 2 shows one example of a sequence of messages that may be communicated between an electronic device 210, device management server 220 and key server 230 such as, but not limited to, the set top box 115, device management server 118 and key server 126 shown in FIG. 1 in order to allow the electronic device 210 to decrypt and execute the encrypted software image. In some embodiments the electronic device 210, along with other electronic devices of its type, may be deployed in the field with the software image encrypted by a global key already installed. The encrypted software image may have been installed, for instance, by the manufacturer or the service provider who deploys the electronic device. In other embodiments the encrypted software image may be installed after the electronic device 210 has been deployed in the field. For instance, in the illustrative environment shown in FIG. 1, the encrypted code image 240 may be delivered to electronic device 115 over the communications network 124 by the service provider 112. In either case, FIG. 2 illustrates at 1 and 2, respectively, the software image 240 being encrypted with the global key GK and provisioned in the electronic device 210.

Regardless of how the encrypted software image has been delivered to the electronic device 210, the electronic device 210 will not be able to decrypt and run the software. However, this encrypted software generally will be only component of the overall software on the device 210 and the device 210 will typically be able to execute this remaining software.

Next, as indicated at 3, the device management server 220 sends a trigger message to the electronic device 210 requesting it to acquire GK so that it can start execution of the encrypted software image. In some embodiments this trigger message is authenticated such that only an authorized device management server can send it. In response to the trigger, the electronic device 210 initiates at 4 establishment of a two-way secure (encrypted and authenticated) session with the key server 230. This can be accomplished using, for instance, a standard protocol such as SSL, TLS or IPSec/IKE. As part of this process a symmetric session key is shared between the electronic device 210 and the key server 230. Alternatively, a proprietary method may be used to establish unique message encryption and authentication keys that are shared only between the key server 230 and the one particular electronic device 210. The electronic device 210 then sends over the secure session a request at 5 for the GK that is protected by the secure session established in step 4.

Optionally, as indicated at 6, the key server 230 may verify that the electronic device 210 is authorized to decrypt the encrypted software image. This step will not always be required since the trigger message sent by the device management server 220 at 3 should only be sent to an electronic device that is already known to be authorized. In any case, if the key server 230 is to verify the authorization, it may use any of a variety of different methods or a combination of different methods. For instance, the key server 320 may check the device identifier against a white list of authorized devices. The device identifier can be established, in one embodiment, by extracting it from the device's digital certificate that would typically have been provided when the secure session was established. Examples of device identifiers that may be used include, without limitation, a serial number, a MAC address, or any other suitable identifier. Alternatively (or in addition), instead of authorizing the particular device, the key server 230 may check that the device model is authorized. The device model may be included either in the digital certificate provided during establishment of the secure session or it may be sent by the electronic device 210 with the messages that are sent at 4 or 5. Yet another authorization technique that may be employed checks to see that the network operator is authorized. The network operator's identity may be included, for instance, in the request message sent at 5.

After the request message at 5 has been received by the key server 230 or after the optional authorization step has been performed at 6, the key server 230 sends the GK back to the electronic device 210, protected by the secure session such that only the intended electronic device 210 can decrypt the GK with the session key that was generated when the secure session was established. The electronic device 210 can then utilize the GK to decrypt and execute the encrypted software image.

Figure 3:
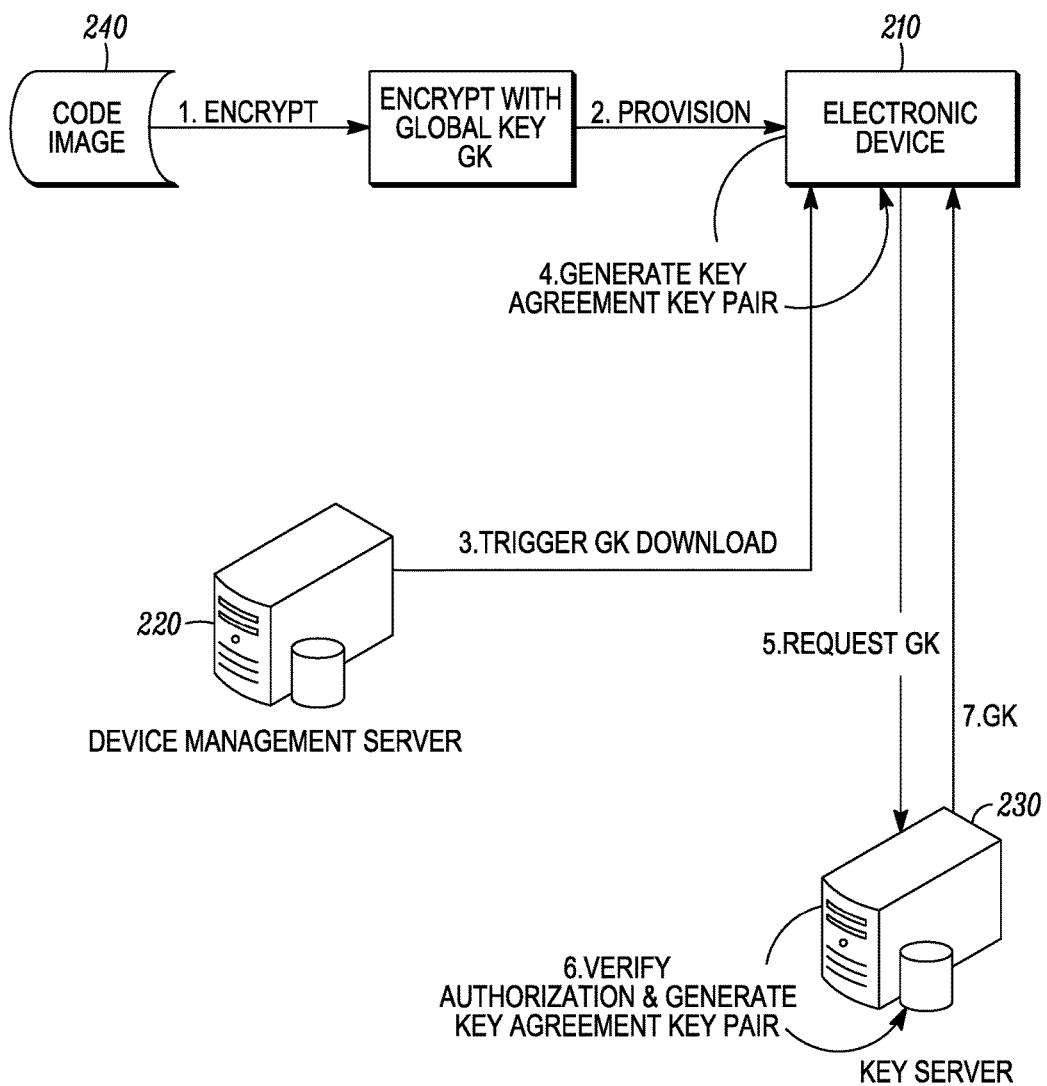
FIGS. 3 and 4 show alternative examples of a sequence of messages that may be communicated between the electronic device, device management server and the key server so that the electronic device is able to decrypt and execute an encrypted software image.

FIG. 3 shows another example of a sequence of messages that may be communicated between the electronic device 210, the device management server 220 and the key server 230 in order to allow the electronic device 210 to decrypt and execute the encrypted software image. In FIGS. 2 and 3 and the figures that follow, like elements are denoted by like reference numerals. The example in FIG. 3 differs from the example of FIG. 2 in that a secure session is established with a key agreement algorithm at the same time the GK is provided to the electronic device 210. This requires a custom protocol but provides additional efficiency and reduces the number of messages that need to be exchanged.

Similar to the example in FIG. 2, the process illustrated in FIG. 3 begins by encrypting the software image with the global key GK at 1 and delivering the encrypted software image to the electronic device at 2 by any suitable means such as those discussed above, either before or after the electronic device 210 has been deployed to the end user. As before, the electronic device 210 will not be able to decrypt and run the encrypted software image, although it will generally be able to execute other software available to it.

Also similar to the example in FIG. 2, the device management server 220 sends a trigger message at 3 to the electronic device 210 requesting it to acquire the GK so that it can start execution of the encrypted software image. In one embodiment, this trigger message is authenticated such that only an authorized device management server can send this trigger.

Next, in response to the trigger message, the electronic device 210 generates at 4 a key agreement key pair where PKDEV is the cryptographic public key and PrKDEV is the cryptographic private key. The electronic device 210 then sends a request for the GK at 5. In one embodiment, the request includes the following parameters:

a. PKDEV—the key agreement public key just generated by the electronic device 210;

b. The electronic device's digital certificate, which contains the public key PVERDEV of the device used for signature validation. This public key corresponds to the device's private signing key PrSIGDEV. This public/private key pair belongs to the same electronic device 210, but is different from the key pair PKDEV and PrKDEV utilized for key agreement;

c. Optionally, a random numerical string (a nonce) and a current timestamp, which may be used for preventing replay attacks;

d. A digital signature over the whole message, which is generated using PrSIGDEV.

At 6, the key server 230 verifies the signatures on the device certificate and on the message received at 5. Optionally, as indicated at 6, the key server 230 may verify that the electronic device 210 is authorized to decrypt the encrypted software image. This step will not always be required since the trigger message sent by the device management server at 3 should only be sent to an electronic device that is already known to be authorized. In any case, if the key server is to verify the authorization, it may use any of a variety of different methods or a combination of different methods. For instance, the key server 320 may check the device identifier against a white list of authorized devices. In particular, the device identifier can be established by extracting it from the device's digital certificate that would typically have been provided when the secure session was established. Alternatively (or in addition), instead of authorizing the particular device, the key server 230 may check that the device model is authorized. The device model may be included either in the digital certificate provided during establishment of the secure session or it may be sent by the electronic device 210 with the request message that is sent at 5. Yet another authorization technique that may be employed checks to see that the network operator is authorized. The network operator's identity may be included, for instance, in the request message sent at 5.

After the optional authorization check, the key server 230 at 6 also generates its own key agreement key pair, where PKSRV is the public key and PrKSRV is the private key. The key server 230 then generates a shared secret SS using one of several key agreement algorithms. For example, using a Diffie-Hellman algorithm, the key server 230 may generate the string PKDEV^PrKSRV mod p, where the symbol ^ represents exponentiation and "mod p" indicates modulus of a large prime number p. Alternatively, the key server 230 may use an Elliptic Curve Diffie-Hellman algorithm to generate PKDEV*PrKSRV, where the symbol "*" represents a special multiplication operation that is specifically defined for Elliptic Curves and is well known in the art of cryptography.

Next, at 7, the key server 230 utilizes the shared secret SS to both encrypt and authenticate a reply message to the electronic device which contains the GK. Alternatively, instead of using the shared secret SS directly, message encryption and authentication keys may be derived from the shared secret using a one way function such as SHA1 or SHA256.

Upon receiving the GK, the electronic device 220 is able to generate the same shared secret SS. For example, if a Diffie-Hellman algorithm is used, the electronic device 220 can generate PKSRV^PrKDEV mod p, where the symbol ^ represents exponentiation and "mod p" indicates the modulus of a large prime number p. Alternatively, if an Elliptic Curve Diffie-Hellman algorithm is used, the key server can generate PKSRV*PrKDEV, where the symbol "*" represents a special multiplication operation that is specifically defined for Elliptic Curves and is well known in the art of cryptography.

Finally, the electronic device 220 verifies and decrypts the received message using the shared secret SS so that it is then able to utilize the GK to decrypt and execute the encrypted software image.

Figure 4:
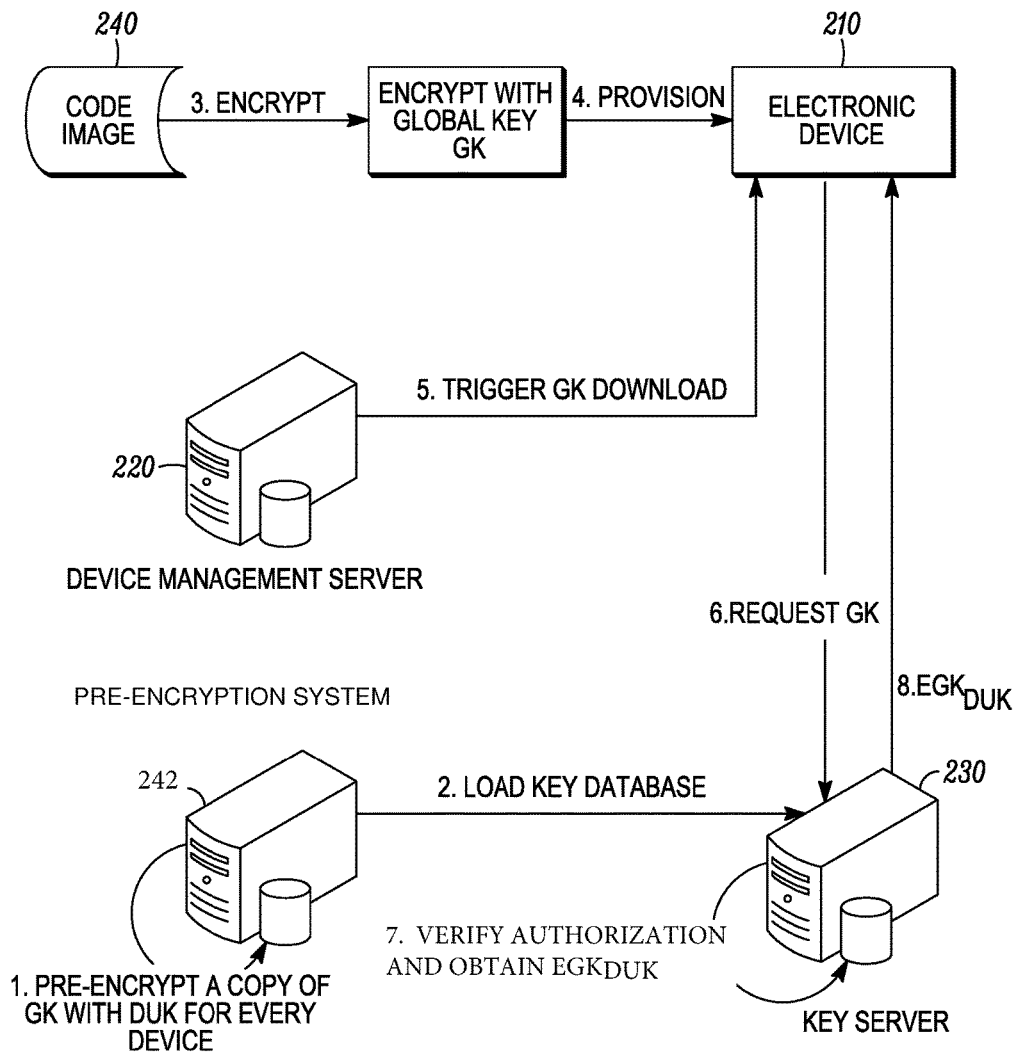

FIG. 4 shows another example of a sequence of messages that may be communicated between the electronic device 210, the device management server 220, the key server 230 and a pre-encryption server 240 whose function will be described below. In this example the owner of the encrypted software image has in advance a list of HW-protected keys, each of which is a unique key associated with an individual electronic device.

The process illustrated in FIG. 4 begins at 1 when pre-encryption system 242, which contains or creates multiple copies of the global key GK, encrypts each GK with a device unique key (DUK). Each such encrypted copy of the GK is denoted as $EGK_{DUK}$. This database of encrypted copies of the GK is loaded onto the key server 230 at 2 so that it is available to requesting electronic devices. In some embodiments the pre-encryption system 242 may provide the database to the key server 230 over a network connection. In other embodiments, however, to enhance security the pre-encryption system 242 may be an offline facility, in which case the database will need to be provided to the key server 230 using a manual process in which the database is physically provided to the key server 230. For instance, the database may be loaded onto a data storage device such as a USB flash drive and physically delivered to the key server 230.

As shown at 3, the software image is encrypted with the GK and, at 4, loaded into each electronic device using any suitable mechanism such as those discussed above. At this stage the electronic devices are not able to decrypt and run this software, although they generally will be able to execute other general-purpose software and encrypted software image is generally only one component of the overall software on the electronic device.

Each electronic device (e.g., electronic device 210) is also provisioned with its own device unique key (DUK) that corresponds to one of the DUKs employed by the pre-encryption system 242. In some cases the DUK may be provided directly in a semiconductor chip (an integrated circuit) that is included in the electronic device. In these cases the DUK may be provided by the chip manufacturer itself, the service provider or a third party. Regardless of how the DUK is provided, a copy also needs to be communicated to the pre-encryption system 242.

Next, similar to the previously described examples, the management server 220 sends a trigger message to the electronic device 210 requesting it to acquire the GK so that it can start execution of the encrypted software image. In one embodiment this trigger message is authenticated such that only an authorized device management server 220 can send this trigger.

Next, at 6, in response to the trigger message, the electronic device 210 sends a request for the GK to the key server 230. The request includes the device identifier of the electronic device 210.

Optionally, at 7, the key server 230 verifies that device is authorized to decrypt the restricted software based on the received device identifier. This optional check may not be necessary since in step 1 the GK is only encrypted for authorized electronic devices. It is not necessary to include encrypted copies of the GK for devices that are not already authorized. Moreover, the trigger message in step 5 is only sent to authorized devices.

After the optional authorization check, also at 7 the key server 230 looks up the encrypted copy of GK ($EGK_{DUK}$) for this individual electronic device based on the device ID. The value of $EGK_{DUK}$ found in the database and at 8 it is returned as is without any further security since only the intended electronic device (e.g., electronic device 210) with the correct key DUK will be capable of decrypting the GK. Finally, the electronic device 220 decrypts the GK with its unique key DUK and then utilizes the GK to decrypt and then execute the encrypted software image.

The encrypted software image that is loaded onto electronic devices and decrypted and executed in the manner described herein may be any software that is executable on the electronic devices on which it is loaded. For instance, one example of such software implements the functionality of a digital rights management (DRM) system. Some DRM systems require a per-model digital certificate and the DRM client software to be installed into an authorized electronic device at the same time. If an electronic device is not to be enabled for that particular DRM system during manufacture, then it may be desirable to delay its access to both the DRM client software and the per-model certificate until the time that the network operator decides to enable the DRM system in that electronic device.

When at a later time some subset of the electronic devices are to be upgraded in the field to support that DRM system, the device manufacturer may wish to keep track of which specific electronic devices have been upgraded to make use of that DRM system. One reason for this may be because the manufacturer may have to pay a licensing fee for each electronic device that has been enabled. If the manufacturer cannot keep track, it may be forced to pay the fee for every single electronic device it manufactured. Another reason may be to prepare for a future security audit. If a security issue is found in the DRM system, it is best to know precisely which electronic devices have been affected. The techniques described herein can be used to address these issues concerning the upgrading of a DRM system since the global key GK used to decrypt the DRM client software can be delivered to a specifically authorized subset of electronic devices.

Another example of software that may be installed and executed using the techniques described herein implements the functionality of a security client such as a conditional access client that is used, for instance, to decrypt Pay TV content on an electronic device such as a set top box or digital television. Such a security client may need to be enabled for electronic devices that are already deployed in the field on the end-user premises. This may be necessary for any of a variety of reasons. For instance, a consumer may move to a different geographic location and wishes to reuse a retail device such as a digital TV or a set-top box, but with a different operator that has deployed a different conditional access system. In another illustrative case, Pay TV Operator A may purchase a new network from Pay TV Operator B and needs to repurpose leased set-top boxes by switching to a different conditional access system that matches the Pay TV headend at that location. In yet another illustrative case a particular conditional access system is known to be widely faulty or defective and is able to be bypassed by pirates. The Pay TV Network operator may decide to fix this security problem by switching to a new conditional access system.

In all of the illustrative use cases described above the Pay TV operator needs to install a new conditional access system into a specific population of deployed devices. The new conditional access system client software image can be encrypted with a global key GK and broadcast or otherwise delivered to all the set-top boxes or other electronic devices in the network, possibly including some that are not intended to be switched to the new conditional access system. The techniques described herein may then be utilized to ensure that only specifically authorized electronic devices obtain the global key GK and make use of the new conditional access system client software.

Figure 5:
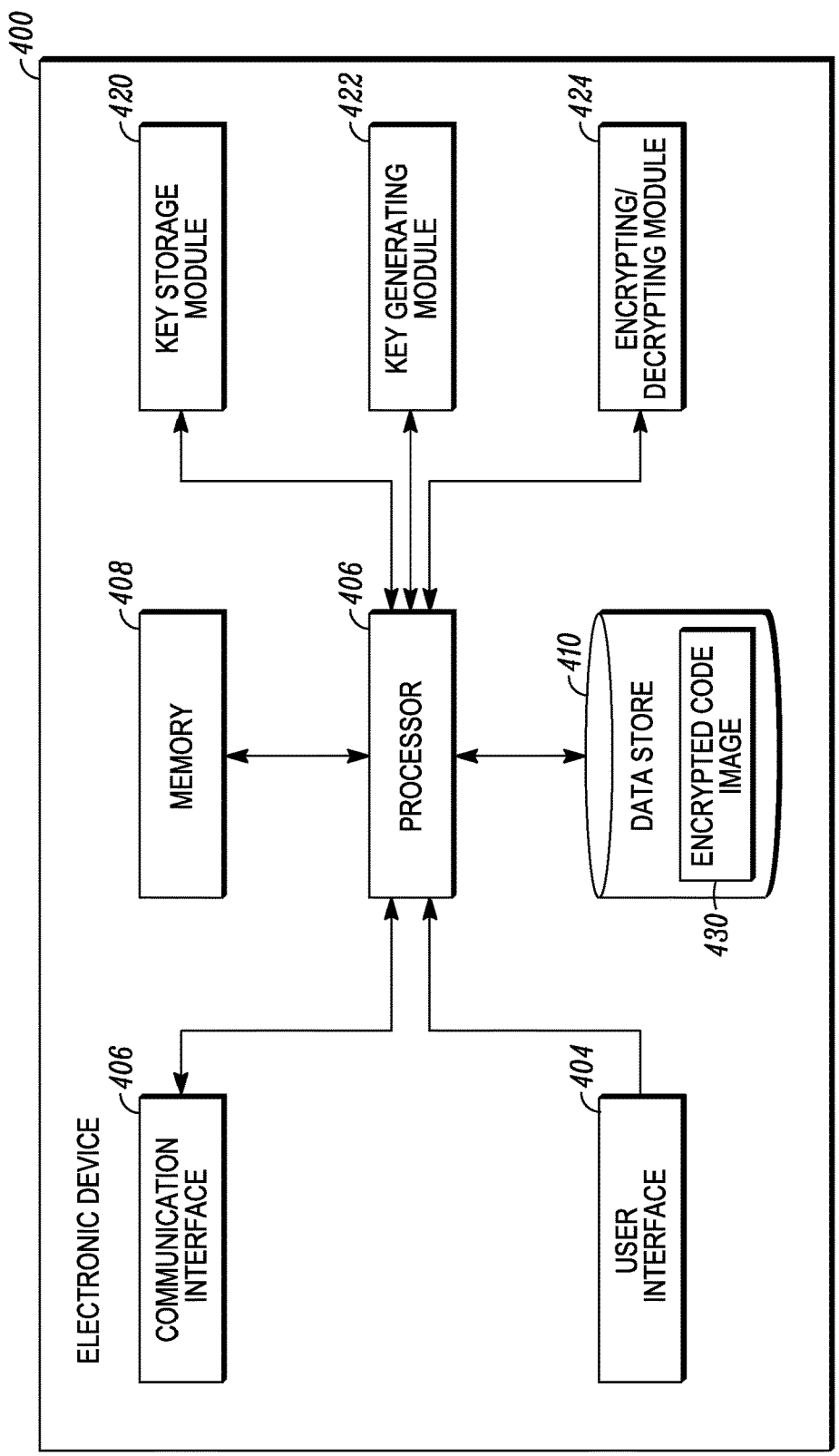
FIG. 5 shows one example of the pertinent components of an electronic device, a device management server and/or a key server that may be employed in the examples described in connection with FIGS. 1-4.

FIG. 5 shows one example of the pertinent components of an electronic device such as electronic device 115 shown in FIG. 1 and the electronic device 210 shown in FIGS. 2-4. While FIG. 5 is described as an example of an electronic device in which an encrypted software image may be stored for subsequent execution, some or all of the components shown in FIG. 5 may also represent an example of the pertinent components of the key server and the device management server described above. It should be apparent to those of ordinary skill in the art that FIG. 5 is a block diagram that represents a generalized illustration and that other components may be added or existing components may be removed, modified or rearranged.

The electronic device 400 includes a processor 402, a user interface 404, a communication interface 406, a memory 408, a data store 410, a key storage module 420 to store cryptographic keys and digital certificates, a key generating module 422 to generate the various sets of keying material used during the process and an encryption/decryption module 424.

The modules 420-424 may comprise software modules, hardware modules, or a combination of software and hardware modules. Thus, in one embodiment, one or more of the modules 420-424 comprise circuit components. In another embodiment, one or more of the modules 420-424 comprise software code stored on a computer readable storage medium, which are executable by one of the processors 402. In a further embodiment, the modules 420-424 may comprise a combination of hardware and software. In some cases the modules 420-424 may be implemented as one more secure hardware modules that are not susceptible to tampering. In any regard, the functionalities of one or more of the modules 420-424 may be combined into a lesser number of modules 420-424 or separated into additional modules without departing from the scope of the invention.

The user interface 404 may comprise a set of keys, buttons, switches, audio transducers, displays and the like through which a user may enter inputs into the electronic device 400. The communication interface 406 may comprise suitable hardware and/or software to enable the electronic device 400 to communicate over the content delivery system.

The memory 408 and the data store 410 may comprise any reasonably suitable computer readable storage media, such as, RAM, ROM, EPROM, EEPROM, magnetic or optical disks or tapes, etc. The memory 408 may store respective programs or algorithms that define the functionalities of the processor 602. In this regard, in instances where the modules 420-424 comprise software modules, the modules 420-424 may respectively be stored as software on the memories 408. The data store 410 may store the encrypted software image 430, as well as various information that the processor 402 may need in addition to the various keys available in the storage module 420.

As disclosed herein, the term "memory," "memory unit," "data store" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method of executing a software image in a selected subset of electronic devices, comprising:
provisioning a plurality of electronic devices with an encrypted software image that is encrypted in each of the electronic devices with a global cryptographic security key;
sending a triggering message to a selected subset of the electronic devices over a communication network, the triggering message requesting the selected subset of electronic devices to acquire the common global cryptographic security key;
receiving, by a key server, from each electronic device in the selected subset a message that includes (i) a public key agreement key of a public/private key pair that is generated by the respective electronic device in response to receipt of the triggering message (ii) a digital certificate of the respective electronic device signed by a private signature key of a certificate authority and (iii) a digital signature over the message that is generated using a private signature key of the respective electronic device;
verifying the digital certificates and message signatures received from the electronic devices and, for each verified electronic device, the key server generating a shared secret using a key agreement algorithm, the public key agreement key of the respective verified electronic device and a private key agreement key of the key server;
using the shared secret that is shared with each respective one of the verified electronic devices to encrypt a reply message to each respective verified electronic device, the reply message including the global cryptographic key; and
sending the reply messages to the respective verified electronic devices so that the verified electronic devices are able to decrypt the reply messages to obtain the global cryptographic key to thereby decrypt and execute the encrypted software images.

2. The method of claim 1, wherein verifying the digital certificates received from the electronic devices further includes verifying that the electronic devices are authorized to decrypt the encrypted software image.

3. The method of claim 1, wherein verifying that the electronic devices are authorized to decrypt the encrypted software image includes comparing a device identifier inside a device certificate of the verified electronic devices against a white list of authorized electronic devices.

4. The method of claim 1, wherein verifying that the electronic devices are authorized to decrypt the encrypted software image includes checking that a device model to which the verified electronic devices belong is authorized.

5. The method of claim 1, wherein verifying that the electronic devices are authorized to decrypt the encrypted software image includes checking that a network operator that operates a network that delivers services to the verified electronic devices is authorized.

6. The method of claim 1, wherein the key agreement algorithm is a Diffie-Hellman algorithm or an elliptic curve Diffie-Hellman algorithm.

7. The method of claim 1, wherein the plurality of electronic devices include a plurality of set top boxes and the encrypted software image includes software implementing a conditional access system.

8. The method of claim 1, wherein the plurality of electronic devices include a plurality of set top boxes and the encrypted software image includes software implementing a digital right management system.

9. The method of claim 1, wherein provisioning the plurality of electronic devices with the encrypted software image includes provisioning the plurality of electronic devices with the encrypted software after the electronic devices have been deployed at end user premises.

10. The method of claim 1, wherein sending the triggering message to the selected subset of the electronic devices includes sending the triggering message from a network operator that operates a network that delivers services to the electronic devices.

* * * * *